United States Patent [19]

Hepworth et al.

[11] 4,225,917
[45] Sep. 30, 1980

[54] ERROR DRIVEN INTERRUPT FOR POLLED MPU SYSTEMS

[75] Inventors: Edward C. Hepworth, Austin, Tex.; Rodney J. Means, Tempe, Ariz.

[73] Assignee: Motorola, Inc., Schaumburg, Ill.

[21] Appl. No.: 655,366

[22] Filed: Feb. 5, 1976

[51] Int. Cl.³ .............................................. G06F 3/04
[52] U.S. Cl. ................................................... 364/200
[58] Field of Search ................. 340/172.5, 147 LP; 364/200 MS File, 900 MS File

[56] References Cited

U.S. PATENT DOCUMENTS

| | | | |
|---|---|---|---|
| 3,286,239 | 11/1966 | Thompson et al. | 364/200 |
| 3,289,168 | 11/1966 | Walton et al. | 364/200 |
| 3,508,206 | 4/1970 | Norberg | 364/200 |
| 3,560,935 | 2/1971 | Beers | 364/200 |
| 3,564,502 | 2/1971 | Boehner et al. | 364/200 |
| 3,573,740 | 4/1971 | Berger et al. | 340/172.5 |
| 3,582,903 | 6/1971 | Verdier | 340/172.5 |
| 3,599,179 | 8/1971 | Arnold | 364/200 |
| 3,618,039 | 11/1971 | Baltzly et al. | 340/172.5 |
| 3,623,010 | 11/1971 | Burkhalter | 340/172.5 |
| 3,665,406 | 5/1972 | Gallagher et al. | 364/200 |
| 3,676,846 | 7/1972 | Busch | 340/172.5 X |
| 3,697,959 | 10/1972 | Abramson et al. | 340/172.5 |
| 3,725,871 | 4/1973 | Heuttner et al. | 340/172.5 |
| 3,729,713 | 4/1973 | Irwin | 364/900 |
| 3,810,120 | 5/1974 | Huettner et al. | 364/200 |
| 3,872,444 | 3/1975 | Cleveland et al. | 340/172.5 |
| 3,902,162 | 8/1975 | Parkinson et al. | 340/172.5 |
| 3,905,025 | 9/1975 | Davis et al. | 340/172.5 |
| 3,911,400 | 10/1975 | Levy et al. | 364/200 |
| 3,919,696 | 11/1975 | Nater et al. | 364/900 |
| 3,938,098 | 2/1976 | Garlic | 340/172.5 |
| 4,047,159 | 9/1977 | Boudry | 364/200 |
| 4,048,481 | 9/1977 | Bailey, Jr. et al. | 364/200 |

Primary Examiner—Melvin B. Chapnick
Attorney, Agent, or Firm—Anthony J. Sarli, Jr.

[57] ABSTRACT

A data processing system in which a central processor polls one or more peripheral devices to initiate a data transfer or to enable a data transfer. The system includes logic associated with a peripheral device or with an interface device for sensing the occurrence of data handling errors such as parity errors, carrier loss, clear to send loss, data overrun or underflow, and for interrupting the central processor upon such occurrence to avoid polling that peripheral device unnecessarily. A status signal is also generated to inform the processor of the nature of the interrupt, so as to distinguish from, for example, the interrupt of another device which is operative to communicate by means of such interrupt rather than by polling.

8 Claims, 6 Drawing Figures

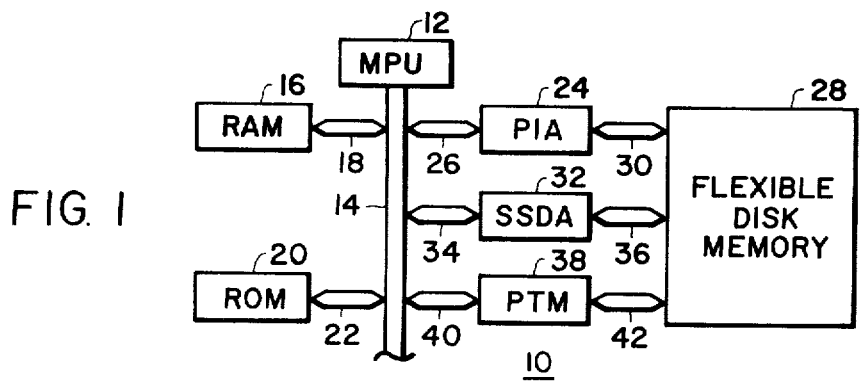
FIG. 1
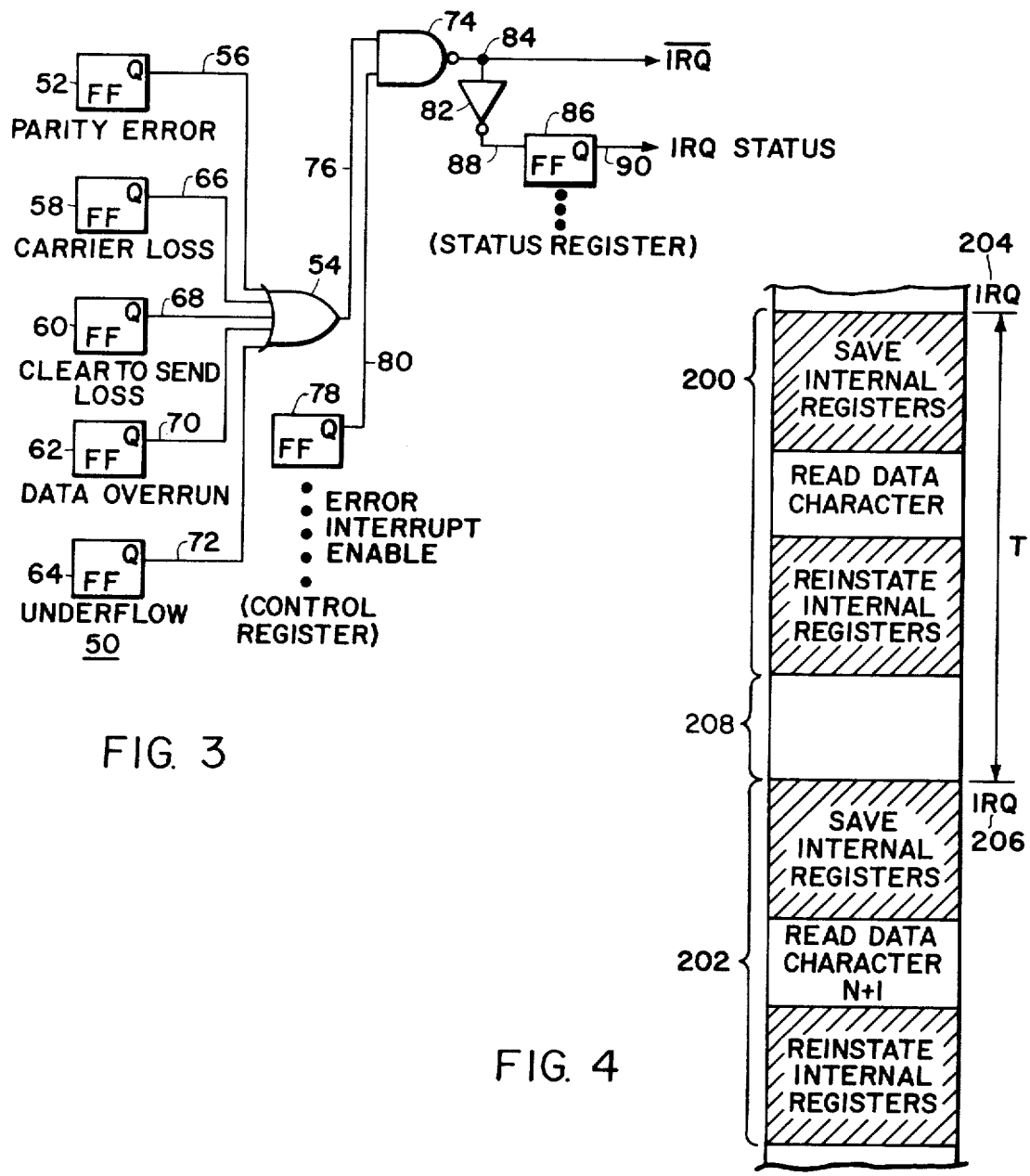
FIG. 3
FIG. 4

ERROR DRIVEN INTERRUPT FOR POLLED MPU SYSTEMS

RELATED APPLICATIONS

This application is related to assignee's copending U.S. Patent Applications Ser. No. 519,149 "MICROPROCESSOR SYSTEM" by Bennett et al filed on Oct. 30, 1974 and Ser. No. 627,180 "SYNCHRONOUS SERIAL DATA ADAPTOR" by Daly et al filed on Oct. 30, 1975.

BACKGROUND

The recent development of various forms of microprocessor units (MPU), particularly those fabricated in the form of MOS monolithic integrated circuits, has made feasible a broad new range of digital control applications and has, concurrently, introduced a number of additional constraints which must be met for the optimum system design of the stored program digital control systems which are based on the MPU. A major constraint is that the cost and complexity of the hardware and programs required to work with associated peripheral units must be minimized. In conventional systems based on stored program digital computers, the cost and complexity of the hardware required for the system to interface with a given peripheral unit is usually a minor consideration when compared with the cost of the main system. Systems based on the use of intergrated circuit microprocessors, however, are much lower in cost because of the economy of integrated circuit fabrication. In systems where an MPU is used to control a large number of peripherals, cost of the hardware, complexity of the interconnecting wiring and the quantity of memory required for program storage are often the dominant constraints. Further, in systems where an MPU is used to control high speed peripherals such as high speed serial memory units via appropriate system interface chips, the amount of MPU "overhead" time, that is the time required by the MPU for performing system functions not related to the peripheral, becomes a dominant constraint.

In MPU based digital systems for relatively low speed serial data applications, an "interrupt driven" mode of system organization is often used. In a typical microprocessor system, each interrupt request generated by a system peripheral would require that internally the MPU would store critical internal register states to enable it to proceed with assigned programming tasks once the interrupt request has been serviced. Typically this process of saving the contents of internal registers could take anywhere from 12 to 24 microseconds. Thus in a low speed serial data system, the amount of time required to service an interrupt request is short relative to the amount of time required to process a single byte of serial data. It follows therefore that the efficient system operation can be obtained by designing the peripheral unit to generate an interrupt request to the microprocessor unit each time a new byte of serial data arrives or when the peripheral unit is available for data transmission.

In MPU-based systems controlling serial data transfer at higher speeds, a "polled" mode of system operation is often used. In this mode of operation, the system program is arranged to interrogate the particular peripheral units dedicated to providing high speed serial data interface at predetermined time intervals. These time intervals are chosen to be short enough so that interrogation and the associated receiving of a byte of data will be accomplished before the next serial byte of data arrives. In such system, interrogation by the controlling MPU usually begins with status checking which verifies internal states within the given peripheral unit. This checking verifies that no data transfer errors such as parity errors or errors due to underflow or overflow have occurred. As serial data transfer rates increase above 250,000 bits per second, MPU-based systems become limited by program execution time even when the systems are designed for a polled mode of operation. Thus it has been difficult to provide efficient and reliable MPU-based data systems for controlling popular new peripheral devices such as flexible disk (floppy disk) memory units.

SUMMARY

Accordingly it is an object of this invention to provide an improved digital system for the control of high speed serial data transfer.

It is a further object of this invention to provide an improved digital system including a microprocessor controlling a serial data adaptor circuit in which higher speed data transfer is obtained by incorporating a polled operating mode and arranging the serial data adaptor circuit to automatically generate an MPU interrupt request for any data error thereby eliminating the time lost in status checking by the MPU.

Briefly described the present invention is a digital system which obtains higher data transfer rates by using a bus interfaced MPU to control a serial data transfer peripheral circuit in a polled operating mode in which repetitive status checking has been eliminated by providing the peripheral circuit with the capability for automatically generating an MPU interrupt request when a data transfer error occurs.

BRIEF DESCRIPTION OF THE DRAWINGS

FIG. 1 shows an MPU based digital system controlling a high speed flexible disk memory unit.

FIG. 3 is a partial logic schematic illustrating the logical combination of data malfunctions to produce an interrupt request according to the present invention.

FIG. 4 is a diagram illustrating the effect of repeated interrupt requests on the execution of an MPU system program.

DETAILED DESCRIPTION

Figure 2C:
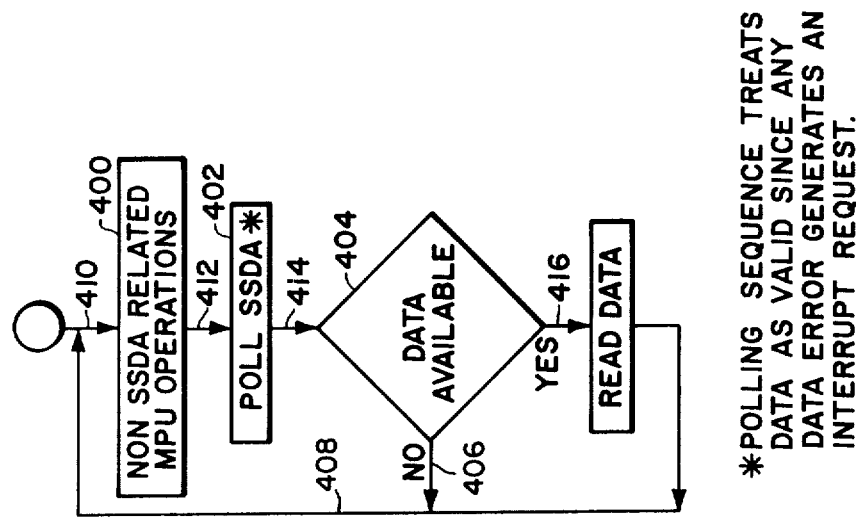
FIG. 2A through FIG. 2C show comparative operating sequences illustrating digital system operation according to the present invention.

FIG. 1 shows a block diagram of a digital system 10 which is a particular embodiment of a system providing a capability for higher speed data transfer in accordance with the present invention. Digital system 10 comprises a microprocessing unit 12 coupled to a bidirectional bus 14 which provides the basic capability for transfer of data signals and control signals to and from the microprocessing unit. Bidirectional bus 14 is in turn coupled to a random access memory (RAM) 16 via a bidirectional link or interface 18. Bidirectional bus 14 is also coupled to a read only memory (ROM) 20 via bidirectional link or interface 22. Similarly, bidirectional bus 14 is coupled to peripheral interface adaptor (PIA) 24 via bidirectional link 26 which in turn is coupled to flexible disk memory 28 via control bus 30. Bidirectional bus 14 also couples to synchronous serial data adaptor (SSDA)

32 via bidirectional link 34. Synchronous serial data adaptor 32 couples to flexible disk memory 28 via data link 36. Bidirectional bus 14 also couples to program timer module (PTM) 38 via bidirectional link 40. Program timer module 38 also couples to flexible disk memory 28 via timing control link 42. Additional details relating to the operation of MPU 12 and especially information concerning system operation involving communication with peripheral units over a bidirectional bus as typified by digital system 10 are provided in assignee's copending patent application Ser. No. 519,149 previously mentioned. Similarly, additional information concerning the operation of SSDA circuit 32 is provided in assignees' copending patent application Ser. No. 627,180 also previously mentioned.

FIG. 3 shows a digital logic circuit 50 representative of the error register and error interrupt circuit incorporated in SSDA 32 according to the present invention. Logic circuit 50 comprises parity error flip-flop 52 whose Q output couples to an input of OR gate 54 via conductor 56. Similarly, the Q outputs of carrier loss flip-flop 58, clear-to-send loss flip-flop 60, data overrun flip-flop 62 and underflow flip-flop 64 are coupled to inputs of OR gate 54 via conductors 66, 68, 70 and 72 respectively. The output of OR gate 54 couples to an input of NAND gate 74 via conductor 76. The Q output of error interrupt enable flip-flop 78 is coupled to a second input to NAND gate 74 via conductor 80. Error interrupt flip-flop 78 is contained in a control register of SSDA circuit 32. The output of NAND gate 74 couples to the input of inverter 82 via conductor 84 which also provides the interrupt request output for digital logic circuit 50. The output of inverter 82 couples to the set input of IRQ status flip-flop 86 via conductor 88. IRQ status flip-flop 86 is contained in a status register of SSDA 32. The Q output of IRQ status flip-flop 86 couples to conductor 90 which provides the IRQ status output for digital logic circuit 50.

Figure 2B:
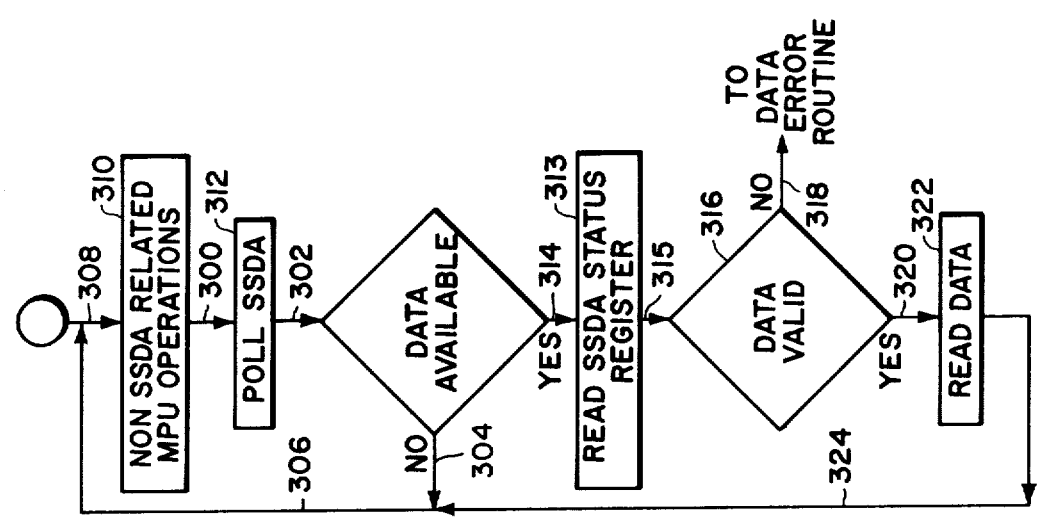
Figure 2A:
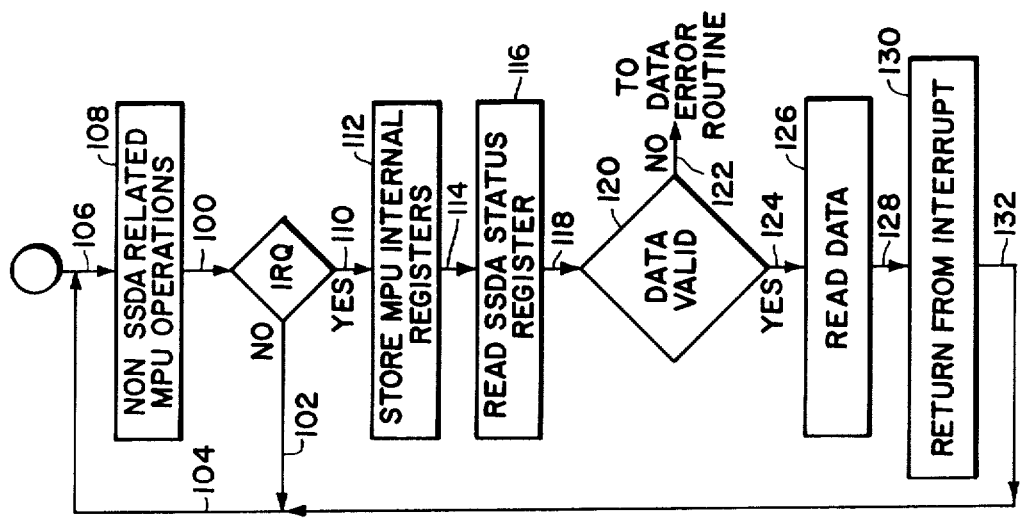

The mode of operation of the present invention is explained by considering system and logic schematics of FIGS. 1 and 3 in conjunction with the flow diagrams of FIGS. 2a-2c and the program execution diagram of FIG. 4. In organizing an MPU-based digital system to control the serial transfer of data, the pacing constraint is often the ability of the system to read and process a character of serial data before the successive characters arrive causing an overrun. Thus, referring to the particular embodiment of FIG. 1, system control of a data interface circuit such as SSDA 32 must provide that serial data on data link 36 is converted into parallel form by the interface circuit and read into MPU 12 via bidirectional link 34 and bidirectional bus 14 at a rate which is rapid enough to be consistent with the serial data rate present on data link 36. For lower speed serial data applications, as MPU-based system such as digital system 10 can be organized to operate in an "interrupt-driven" mode of operation. It should be noted that such a low speed application would normally involve some kind of data peripheral different from the flexible disk memory 28 shown in FIG. 1. FIG. 2a shows a flow chart illustrating the interrupt driven mode of operation. The basic assumption in this mode of operation is that the data interface circuits (in this case SSDA circuit 32) will generate an interrupt request when a received data character is ready to be transferred onto the MPU bus. Using the symbology of the flow chart, it is thus assumed until an interrupt request occurs, MPU circuit 12 will continue to operate in the loop form by paths 100, 102, 104 and 106 performing non-SSDA related operations 108. The internal operation of MPU circuit 12 requires that when an interrupt request occurs, a standard sequence of program instructions must always be performed to insure that critical internal register states are stored. This is required to insure that MPU circuit 12 can properly resume the execution of its assigned programming tasks, as specified by stored programs, once the interrupt request has been properly serviced. Thus, when the occurrence of an interrupt request causes MPU circuit 12 to exit its previous operating loop via path 110, the MPU completes its current instruction and then a fixed number of program cycles are required to store internal registers as is shown symbolically by operation 112 in FIG. 2a. Once this operation is complete, MPU circuit 12 proceeds via path 114 to service the particular interrupt request. For this particular case, servicing the interrupt request will require transferring the received data character into MPU circuit 12 via bidirectional link 34 and bidirectional bus 14 (FIG. 1). Before this transfer can be accomplished however, status checking is normally performed to verify that no data transfer errors such as parity errors have occurred in receiving the data character. This is illustrated in FIG. 2a by operation 116, path 118 and decision operation 120. If a data error has occurred, operations proceed via path 122 to a data error routine. If the data is valid, operations proceed via path 124 and operation 126 whereupon data is transferred to MPU circuit 12 and the system is now ready to resume non-SSDA related tasks. Before resuming these tasks, however, another fixed number of program operations are required to retrieve internally stored register states from random access memory 16 (FIG. 1) such that the internal operating state of MPU circuit 12 is restored as required for resumption of previous operations. Thus the operating sequence shown in FIG. 2a proceeds via path 128 to a return from interrupt operation 130 which allows the internal states of MPU circuit 12 (FIG. 1) to be restored before operations proceed via path 132 to resume the original operation. Although the interrupt driven mode of operations is described as adequate for low speed serial data applications, higher data rates generate interrupt requests in such rapid succession that the associated fixed amounts of program execution time required to complete the current instruction, save the MPU internal register states and then to reinstate MPU internal register states become large relative to the total amount of real time available. This is illustrated by the diagram of FIG. 4 which symbolizes the sequence of program words (200, 202) executed by MPU circuit 12 (FIG. 1) in reading successive data characters. As the received data rate increases, the period of time, T, between successive interrupt requests (204,206 in FIG. 3) will decrease. Since the sequences 200, 202 have a fixed execution time a decrease in T will correspondingly reduce the amount of time available to perform the program sequence 201 which controls the operations of MPU circuit 12 not related to reading data. When the time available for sequence 201 reaches some minimum value, MPU circuit 12 cannot keep up with the rate of data arrival and a "data overrun" occurs.

One way of increasing the data handling capacity of an MPU system beyond the capacities available in the interrupt driven mode is to adopt a "polled" mode of operation as illustrated by the flow chart of FIG. 2b. In this mode of operation the control program of the MPU circuit 12 includes program segments which interrogate or "poll" the data interface circuits (in this case SSDA circuit 32) on a repetitive basis. Thus MPU circuit 12 will continue to operate in the loop formed by paths 300, 302, 304, 306 and 308 in performing the non-interface related operations 310 and the periodic interrogation of operation 312. When the results of polling SSDA circuit 32 indicate that data is available to be read into MPU circuit 12 (a change in the state of an SSDA control register), system operation proceeds via branch 314. For transferring the received data character to MPU circuit 12 via bidirectional link 34 and bidirectional bus 14 (FIG. 1), the system must perform status checking as was previously discussed for FIG. 2a to verify that no data transfer errors such as parity errors have occurred in receiving the data character. This is illustrated by operation 313, 315 and decision operation 316 in FIG. 2b. If a data error has occurred operations proceed via path 318 to a data error routine. If the data is valid, operations proceed via path 320 and operation 322 whereupon data is transferred to MPU circuit 12 and the system can now resume non-interface related tasks via paths 324 and 306. For the system operating sequence illustrated by the flow chart of FIG. 2b, one of the limiting factors affecting data transfer rates is the program execution time required to perform the status checking illustrated by the operation 316. Although this program execution time is less than the program execution time required to service an interrupt request in the system operating mode of FIG. 2a, it remains a fixed element of program "overhead" associated with the reading of a given data character. Thus, higher received data rates will generate successive status checks with such rapid succession that the associated fixed segments of program execution time will become large relative to the total amount of real time available. The situation is thus analogous to the interrupt mode of operation as symbolized in FIG. 4 in that when the received data has increased to the point where there is not sufficient program time remaining to perform non-interface related tasks, MPU circuit 12 cannot keep up with the rate of data arrival. Although the upper limit on received data rate is higher for the polled operating mode the operating requirements of higher speed data peripheral units such as flexible disk memory units demonstrate a need for system organization which minimizes the fixed program execution time associated with reading a data character.

FIG. 2c shows the improved operating sequence obtained for a polled MPU system provided with error driven interrupt according to the present invention. Pending the arrival of data characters to be read, MPU circuit 12 (FIG. 1) performs non-interface related tasks as indicated by operation 400 and repetitively interrogrates or polls SSDA circuit 32 as indicated by operation 402. With no data available to be read, the system exits decision operation 404 at path 406 and continues to operate in the loop form by paths 408, 410, 412 and 414. Up to this point, system operation is analogous to the polled mode of operation previously discussed for FIG. 2b. The improved system operation according to the present operation occurs when data becomes available to be read such that the system exits decision operation 404 via path 416 where MPU circuit 12 (FIG. 1) immediately proceeds to read data without devoting any program execution time to status checking as was previously required in the operating sequence of FIG. 2b. The polling sequence of MPU circuit 12 treats data as valid because in the improved system, SSDA circuit 32 provides that the occurrence of any data error will automatically generate an interrupt request. FIG. 3 shows a logic circuit 50 representative of the data error interrupt request generating circuitry of SSDA circuit 32. As the serial data bits of a received data character are accumulated and converted to parallel form by SSDA circuit 32, the occurrence of any data error is recorded in an appropriate flip-flop. FIG. 3 shows typical data error flip-flops such as the parity error flip-flop 52, carrier loss flip-flop 58, etc. The occurrence of a data error sets the appropriate flip-flop resulting in the logic "1" at the input of OR gate 54 which correspondingly produces logic "1" at conductor 76 which is an input to NAND gate 74. If the error interrupt enable flip-flop 78 is set under MPU program control, conductor 80 will also be a logic "1" resulting in logic "0" at conductor 84 which is the $\overline{IRQ}$ output of SSDA circuit 32. Logic "0" of the $\overline{IRQ}$ output of SSDA circuit 32 is an interrupt request to MPU circuit 12. This logic "0" is also inverted by inverter 82 to produce logic "1" on conductor 88 which sets IRQ status flip-flop 86, resulting in logic "1" on conductor 90. When MPU circuit 12 services the interrupt request generated on conductor 84, the logic state of flip-flop 86 establishes the fact that the interrupt request was due to a data transfer error rather than some other cause. The result of incorporating data interrupt circuitry typified by the particular embodiment of circuit 50 shown in FIG. 4 is an improved operating sequence in which checking the error status of each data character before it is read is no longer required. This reduces the fixed program execution time associated with the reading of each successive data character and correspondingly increases the net amount of program time available between successive data characters. The resulting effect is that this additional time available allows MPU circuit 12 to keep up with the rate of data arrival associated with higher speed data peripheral units such as flexible disk memory 28. If an error does occur the MPU interrupt sequence requests retransmission of data from flexible disk memory 28.

What is claimed is:

1. A data processing system comprising:
 (a) a processing unit;
 (b) a plurality of peripheral devices;
 (c) means coupled by a bus means to said processing unit and said peripheral devices for transferring digital data therebetween;
 (d) polling means within said processing unit for periodically sequentially addressing said peripheral devices to enable a data transfer between said peripheral devices and said processing unit;
 (e) means for signalling the occurrence of data handling errors in one of said peripheral devices;
 (f) means, responsive to a signal from said means for signalling upon the occurrence of an error, for interrupting the polling operation of said processing unit;
 (g) second means responsive to said means for signalling the occurrence of data handling errors for indicating to the processing unit upon the occurrence of an error the nature of the interrupt of said processing unit; and
 (h) means responsive to the absence of said signal for completing a data transfer, whereby a polling operation automatically assumes a valid data transfer in the absence of said signal.

2. A data processing system as set forth in claim 1 wherein said means for signalling comprises means having a plurality of logic states for recording the occurrence of said data handling errors by assuming a predetermined state.

3. A data processing system as set forth in claim 2 wherein said means for recording is a plurality of registers, each of said registers being responsive to a predetermined type of data handling error.

4. A data processing system as set forth in claim 3 wherein said registers are flip-flops.

5. In a data processing system comprising a central processing unit and a plurality of peripheral devices connected thereto by means of a data bus, at least one of said peripheral devices having an interface device between it and said bus, the improvement comprising:
 (a) polling means for periodically addressing said peripheral devices to allow transmission of data from said CPU to an addressed peripheral device or from said addressed peripheral device to said CPU,
 (b) said at least one peripheral device having means for detecting data handling errors associated with said one peripheral device,
 (c) said interface device having means responsive to said means for detecting errors for generating an interrupt signal upon occurrence of an error, and
 (d) means associated with said CPU responsive to said interrupt signal for halting further polling until said interrupt signal is removed, and whereby a polling operation automatically assumes a valid data transfer in the absence of said interrupt signal.

6. In a data processing system as set forth in claim 5, further means associated with said interface device for generating a status signal indicative of the nature of said interrupt signal.

7. A data processing system as set forth in claim 5 wherein said error detecting means comprises:
 (a) register means for recording the occurrence of said data handling errors by establishing predetermined logic states in response thereto, and
 (b) logic means for combining the logic states of said register means to produce an error signal.

8. A data processing system as set forth in claim 7 further comprising means for selectively inhibiting said interrupt signal under CPU control.

* * * * *

UNITED STATES PATENT AND TRADEMARK OFFICE
CERTIFICATE OF CORRECTION

PATENT NO. : 4,225,917
DATED : September 30, 1980
INVENTOR(S) : Edward C. Hepworth et al It is certified that error appears in the above-identified patent and that said Letters Patent are hereby corrected as shown below:

In column 7, claim 5, line 2, after "unit" insert --- (CPU) ---.

Signed and Sealed this

Thirteenth Day of January 1981

[SEAL]

Attest:

Attesting Officer

SIDNEY A. DIAMOND

Commissioner of Patents and Trademarks